UNITED STATES PATENT OFFICE 2,632,021

ESTERIFICATION PROCESS UTILIZING ADDED UNSATURATED ACIDS

Samuel B. Robison and John Rehner, Jr., Westfield, N. J., assignors to Standard Oil Development Company, a corporation of Delaware No Drawing. Application March 6, 1951, Serial No. 214,212

12 Claims. (Cl. 260—475)

This invention relates to improvements in the methods of esterifying synthetic alcohols. More particularly, this invention relates to improved methods of esterifying synthetic branched chain alcohols of the $C_6$ to $C_{11}$ range by incorporating in the esterification reaction mixture small amounts of unsaturated aliphatic dicarboxylic acid derivatives.

The ever expanding use of plastic materials such as vinyl chloride polymers or copolymers, polyvinyl acetate, cellulose esters, acrylate and methacrylate resins, rubbers such as the emulsion copolymers of butadiene with styrene or acrylonitrile, or the copolymers of isobutylene with small amounts of a diolefin such as isoprene, have created a large demand for suitable plasticizers. Normal and branched chain alkyl organic acid esters and particularly alkyl phthalic acid esters and more particularly di-2-ethylhexyl phthalate, have been known to be satisfactory plasticizers for the aforementioned high molecular weight plastic materials.

Synthetic branched chain Oxo alcohol products produced by the well-known Oxo process (see e. g. U. S. Patent 2,327,066 and U. S. Bureau of Mines Publication Rl 4270, "Critical Review of Chemistry of the Oxo Synthetic, etc." 1948) have also come into commercial use in the production of esters suitable for plasticizers, by reaction with both aromatic and saturated aliphatic acids or anhydrides including such examples as phthalic acid, sebacic acid, stearic acid, lauric acid and adipic acid. Certain of the synthetic alcohols prepared by the oxonation and hydrogenation reaction are known to be especially suitable for the manufacture of ester plasticizers and, particularly, for use in clear plastics. These include alcohols of from $C_4$ to $C_{13}$ range, such as the butyl alcohols, the octanols, and the nonanols with the $C_6$ and $C_{11}$ alcohols preferable. It has recently been learned that synthetic alcohols of the $C_8$ series, and particularly those chosen from the iso-octyl type, are among the best type of esterification alcohols to prepare plasticizers, especially the phthalic acid esters.

It is essential that these esters have good color, i. e., a relative absence of color so as not to color the clear resins. This latter criterion is difficult of realization, however, probably because of complex impurities present in the synthetic alcohols which are difficult to ascertain. It is particularly difficult to obtain esters of the color desired from an acid catalyzed esterification process, a process which has proven very satisfactory except for the excessive ester color. The esters from this process are usually excessively colored and, hence, unsuitable for use as plasticizers for clear resins.

It has now been found that these difficulties in the acid catalyzed esterification reaction between aromatic and saturated aliphatic carboxylic organic acids or their derivatives, and especially phthalic acid, and the indicated synthetic alcohols are completely overcome by the addition of small amounts of unsaturated aliphatic dicarboxylic acid derivatives to the esterification reaction mixture. The resulting esters have distinctly less color and, hence, are vastly superior to those esters obtained from similar acid catalyzed processes which do not utilize the agents of this invention.

The exact mechanism by which the unsaturated aliphatic dicarboxylic acid derivatives prevent the formation of undesirable color is not clearly understood. The impurities, probably present in the alcohols, which act as color formers are extremely complex in nature and probably include sulfur compounds. The active addition agents of this invention apparently operate by converting these color-forming bodies to innocuous matter.

Unsaturated aliphatic dicarboxylic acid derivatives utilized are illustrated by compounds such as the anhydrides, esters, acids, salts, etc., of the unsaturated dicarboxylic acids. Typical of these type compounds are:

Maleic acid
Fumaric acid
Ethyl hydrogen maleate
Dimethyl maleate
Dimethyl fumarate
Diethyl maleate
Diethyl fumarate
Diisobutyl maleate
Fumaryl chloride
Fumaronitrile
N-isobutylmaleimide
Methylmaleic anhydride
Itaconic anhydride
Methylfumaric acid
Dimethylmaleic anhydride
Dichloromaleic anhydride
Dibromomaleic anhydride
Acetoxymaleic anhydride The word, "unsaturated," is employed herein in its normal connotation, i. e., compounds containing carbon to carbon double bond linkages. Conversely, the term, "saturated," indicates that the compounds so identified have no carbon to carbon double bond linkages. The term "aliphatic dicarboxylic acid derivative" is employed to connote those compounds which contain two

groups or the anhydride structure

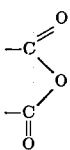

resulting from the condensation of two carboxyl groups.

Particularly effective unsaturated aliphatic dicarboxylic acid derivatives are agents selected from the group consisting of anhydrides, esters and acids of an acid selected from the group consisting of maleic and fumaric acid. Especially effective and desirable agents are the maleic acid derivatives, e. g., maleic anhydride and esters such as diethyl maleate.

The alcohols for use in the indicated esterification reaction are preferably obtained by the Oxo process. The term, "Oxo" process, is well understood in the art as referring to a process wherein an olefin feed is first reacted or "oxonated" with carbon monoxide and hydrogen at a temperature between 120 and 250° C., and under a pressure of about 150 to 400 atmospheres in the presence of a cobalt or similar catalyst, generally introduced in the form of a fatty acid salt, to form aldehydes in accordance with the following reaction:

$$C_nH_{2n} + H_2 \rightarrow C_nH_{2n+1}CHO$$

The aldehydes so formed are then catalytically hydrogenated to form the desired alcohols as follows:

$$C_nH_{2n+1}CHO + H_2 \rightarrow C_nH_{2n+1}CH_2OH$$

The preferred hydrogenation catalysts are those of the sulfur-sensitive nickel type though other known hydrogenation catalysts, such as the sulfides of nickel, molybdenum and cobalt, with or without support on carbon, silica, etc., can also be used, especially where a rugged sulfur-insensitive catalyst is desired.

The over-all carbonylation, or so-called Oxo reaction, as outlined above, provides a particularly effective method for preparing valuable primary alcohols, particularly of the $C_4$ to $C_{12}$ range, which finds large markets as intermediates for detergents and plasticizers. The $C_6$ to $C_{11}$ Oxo alcohol products are especially preferred for use in forming esters to be used as plasticizers in light-colored or colorless plastics and resins.

The most readily available olefinic feed stocks for the Oxo reaction as outlined above are selected hydrocarbon streams derived from petroleum refinery sources.

In connection with the Oxo reaction of olefin hydrocarbons, it has been found convenient to classify the various olefins into five fundamental types according to the character of carbon atoms linked by the olefinic bonds. These five types are as follows:

Type I  $CH_2=CHR$
Type II  $RCH=CHR$
Type III 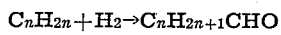
Type IV 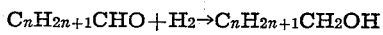
Type V 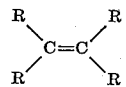

In the above formulas R represents a straight or a branched chain alkyl group, it being understood that where more than one symbol R appears in a formula, the several R symbols may represent the same alkyl group or different alkyl groups. Under this classification, for example, butene-1, 3-ethyl pentene-1, or 4,4-dimethyl pentene 1 are Type I olefins; butene-2, 4,4-dimethyl pentene-2, 2-methyl 5-ethyl hexene-3 are Type II olefins; 2,3,3-trimethyl butene-1 is a Type III olefin; 2,4-dimethyl pentene-2 is a Type IV olefin; tetramethyl ethylene is a Type V olefin; and so forth.

In the Oxo reactions, generally there is no invariable point of attack on the olefinic double bond such as one might predict from Markownikoff's rule, and thus in the case of Type I olefins of the formula $H_2C=CHCH_2R$, approximately equal amounts of both 1-substituted alcohols of the formula $CH_2OH.CH_2.CH_2.CH_2R$ and 2-substituted alcohols of the formula $$CH_3.CH(CH_2OH).CH_2R$$

are formed, with the 1-position being slightly favored. It is thus apparent that the Oxo process is inherently committed to the production of at least some branched chain primary alcohols even when the starting material is a pure Type I straight chain olefin. Type V olefins are usually incapable of oxonation. The oxonation feed may contain mono-olefins of any type and suitable olefinic feeds may be fractionated, for example, from cracked gases, from Fischer-Tropsch synthesis products or from a polymerized stream of $C_3$ to $C_5$ olefins.

The alcohols formed by oxonation of the olefinic materials described above are naturally quite complex in character and the exact composition of many of these products is not known. The $C_8$ Oxo alcohols obtained have thus been found to comprise a mixture of isomers.

Studies have been carried out to elucidate experimentally the structural composition of these iso-octyl alcohol isomers. The combined techniques of cracking the stearic acid ester, analyzing the resulting olefins for type by infrared, hydrogenating and analyzing the resulting paraffins for individual components have been employed. Several conclusions can be drawn:

1. The isomers present comprise predominantly those having five and six carbon atoms in the longest straight chain.

2. To the extent of at least 85%, and probably 95%, or more, there are no alkyl groups in the 2-position.

3. Of the possible 5% having one alkyl group in the 2-position, not more than about 1% based on the total alcohol, could be 2-ethyl hexanol.

4. Not more than 10% (perhaps none) have 2-alkyl groups in the 2-position.

5. Of the eleven possible isomers qualifying under (3) above, two cannot be formed through oxonation and three are highly improbable on the basis of available compositional data on $C_7$ polypropylene. The number of likely principal isomers is thus reduced to five.

The high Type I assay and the boiling range of the olefins derived from iso-octyl alcohol, together with a priori exclusion of 3,3-dialkylated alcohols as products of oxonation, limit the number of possible major constituents of iso-octyl alcohol to nine isomers. On the basis of the best available data, only five of these alcohols could be formed in substantial amounts, the first three predominating.

| Alcohol | Major Constituents of Typical Iso-Octyl Alcohol | |
|---|---|---|
| | B. P., °C. of Alcohol | Percent of Total |
| 4,5-Dimethyl hexanol | | 26 |
| 3,5-Dimethyl hexanol | 176 | 30 |
| 3,4-Dimethyl hexanol | | 18 |
| 3 and/or 5-methyl heptanol | 185.8–186.5 | 17 |
| Miscellaneous and unidentified | | 9 |
| | | 100 |

Typical commercial iso-octyl alcohol also may contain up to about 15% of $C_7$ and lower alcohols and up to about 15% of $C_9$ alcohols.

One typical iso-octyl alcohol mixture has been found to have the following characteristics:

Hydroxyl No. 429
Carbonyl No. 1
Saponification No. 0.5
Acid No. <0.001
A. S. T. M. distillation:
 5% _____ 175.3° C.
 50% _____ 183.3° C.
 95% _____ 188.3° C.
 Final _____ 202.7° C.
 (Recovery 99.0%)

Alcohol purity $$\left(\frac{\text{Hydroxyl No. (429)}}{\text{Theor. Hydroxyl No. (431)}} \times 100\right) = 99.5\%$$

and kinematic viscosity at 68° F., 12.4–12.8 centistokes. In general, it is desirable that the kinematic viscosity of the alcohol be between about 12.0 and 13.0 centistokes at 68° F.

Other synthetic branched chain alcohols, especially those in the $C_7$ to $C_9$ range such as 2-ethyl hexanol, can also be employed in the esterification reaction.

Since the aromatic and saturated aliphatic acids, anhydrides and similar derivatives may be interchangeably employed as reactants in the esterification reaction to achieve the same result in a similar manner, it is to be understood that the term, "phthalic acid," or other organic acid also includes the anhydride, e. g., phthalic anhydride and the other similar derivatives. In a similar manner the term, "alcohol," is to be understood to include other alcohol derivatives which can be employed in the esterification reaction to produce the identical esters.

The esterification process is carried out in the conventional manner for the acid catalyzed process except for the addition of the unsaturated aliphatic dicarboxylic acid derivatives. These esters and particularly the phthalic acid esters can thus be prepared by reacting the alcohol with acid, or with acid anhydride, or by first transforming the alcohol into an alkyl halide and then reacting the latter with a metal salt of the selected acid. For example, phthalate esters may be prepared efficiently by reacting about 2 mols of a suitable alcohol with one mol of phthalic anhydride in the presence of an acid catalyst, e. g., acid resins, sulfuric or an aromatic sulfonic acid catalyst, in an amount of from .01 to 1 weight per cent and using an aromatic solvent such as benzene, toluene, etc.

The esterification reaction is carried to substantial completion by esterification for a sufficient time. The unreacted alcohol is then stripped off from the ester product preferably under reduced pressure and blended with fresh alcohol for returning to the esterification zone.

The catalytic esterification reaction is carried out at a pot temperature of about 100–200° C., depending upon the B. P. and amount of entrainer. It can thus be seen that the esterification reaction is carried out in the conventional manner except for the incorporation of the unsaturated aliphatic dicarboxylic acid derivatives in the reaction mixture. The iso-octyl phthalate ester itself boils at about 200–220° C., at 2 mm. of mercury pressure. The reaction is carried out in corrosion-resistant equipment such as glass-lined equipment.

It is desirable first to subject crude Oxo alcohol to a distillation at pot temperatures preferably not exceeding about 220° C., and preferably with previous caustic treatment, to remove some impurities such as aldehydes, acids, esters, acetals, unsaturated carbonyl compounds, etc.

In general, the preferred amount of unsaturated aliphatic dicarboxylic acid derivatives added to the esterification mixture is in the range of 0.1 to 5 weight percent, based on the reactants employed. The unsaturated aliphatic dicarboxylic acid derivatives may desirably be first dissolved in the alcohol employed or added directly to the reaction system.

This invention is illustrated by the following examples:

EXAMPLE I

The effect of adding of unsaturated aliphatic dicarboxylic acid derivatives to the esterification mixture of phthalic anhydride and an iso-octyl alcohol, prepared by the Oxo process, was determined. Esterification reactions of identically similar reactants were carried out in the same manner as detailed above with the only variable being the addition of different amount of unsaturated aliphatic dicarboxylic acid derivatives.

The following table illustrates the effectiveness of maleic anhydride and diethyl maleate in reducing the color of di-iso-octyl phthalate produced. These esters were all made in a toluene sulfonic acid catalyzed system. The effect of concentration of maleic anhydride from 0.33 to 1.93 weight per cent on reactants is indicated.

*Table I*

| | 1 | 2 | 3 | 3 | 5 | 6 |
|---|---|---|---|---|---|---|
| Iso-Octanol (g.) | 165 | 165 | 165 | 165 | 165 | 165 |
| Phthalic Anhydride (g.) | 94 | 94 | 94 | 94 | 94 | 94 |
| Toluene Sulfonic Acid (g.) | 0.26 | 0.26 | 0.26 | 0.26 | 0.26 | 0.26 |
| Toluene (cc.) | 20 | 20 | 20 | 20 | 20 | 20 |
| Maleic Anhydride (g.) | | 2.60 | 1.73 | 0.87 | 5.20 | |
| Di-ethyl Maleate (g.) | | | | | | 2.60 |
| Esterification Time (Min.) | 210 | 210 | 210 | 210 | 210 | 210 |
| Hazen Color | 100 | 25 | 40 | 40 | 50 | 25 |

The vast improvement in color through the addition of the agents of this invention is apparent. Fifty is normally the upper desirable limit for commercial acceptability on the Hazen Color Scale. The ester prepared in the absence of the agents of this invention had a Hazen color of 100 whereas the esters prepared in the manner taught by this invention, had Hazen colors of only 25 to 50% as great.

EXAMPLE II

The effectiveness of adding a minor concentration of an unsaturated aliphatic dicarboxylic acid derivative in an acid catalyzed esterification system which also had added thereto diphenylol propane as a deterioration inhibitor for standing life, was studied. The results follow in Table II.

*Table II*

|  | 1 | 2 |
|---|---|---|
| Phthalic Anhydride (g.) | 94 | 94 |
| Iso-octanol (g.) | 165 | 165 |
| Maleic Anhydride (g.) | 2.6 |  |
| Toluene (cc.) | 20 | 20 |
| Toluene Sulfonic Acid (g.) | 0.26 | 0.26 |
| Esterification Time (Reflux) (min.) | 200 | 200 |
| Hazen Color | 50 | 125 |

It is apparent that the ester produced with 0.1 weight percent maleic anhydride had substantial color advantage over the product produced without this agent.

After finishing of the esters by stripping, washing, etc., the color build up of each was studied in an accelerated aging test in air at 300° C. after a minor proportion of diphenylol propane had been added to each. Both esters exhibited no sensible color increase upon exposure to air at elevated temperatures indicating that the ester prepared by the process of this invention maintained its advantage. This shows in addition that the unsaturated aliphatic dicarboxylic acid derivatives do not deleteriously affect the functions of the deterioration inhibitors like diphenylol propane.

EXAMPLE III

The iso-octyl phthalates made with various concentrations of maleic anhydride in the reaction system were evaluated as plasticizers for polyvinyl chloride. The evaluation data obtained are shown in Table III. The compounds were prepared with 50 parts by weight of plasticizer based on 100 of polyvinyl chloride. Compounds with and without diphenylol propane dissolved in the plasticizer were evaluated. In preparing the test vinyl blend samples, 100 gms. of polyvinyl chloride resin were dry-blended by hand with 1 gm. of lead stearate, 50 gms. of plasticizer and 2 gms. of sodium organo phosphate (Vanstay 16). The results are tabulated in the table below.

Tensile properties were determined in the usual manner on a Scott Tester (model L-5) at about 75° F., and 50% relative humidity, the rate of jaw separation being 20 inches per minute.

The results in Table III indicate that the plasticizers prepared by the process of this invention do not deleteriously affect the tensile properties of these stocks nor inhibit their stabilization with diphenylol propane.

The improvement of ester color obtained through the process of this invention persists through the steam stripping operations of the ester.

The process of this invention is also applicable to the esterification of other $C_7$–$C_9$ branched alcohols such as 2-ethyl hexanol and yield similar but not as marked advantages. Other additives may be added to the esterification system as stabilizers for the esters such as diphenylol propane, 2,2-bis (4-hydroxy-5-methyl phenyl) propane, 2,2-bis (4-hydroxy-5-isopropyl phenyl) propane and bis (2-hydroxy-5-chlorophenyl) methane.

The unsaturated dicarboxylic acid compounds also may be employed to remove undesirable color from esters which already have this color present.

It will be understood further that the foregoing examples have been given merely for purposes of illustration, but that other modifications of the present invention are possible without departing from the scope of the appended claims.

What is claimed is:

1. In a process for the preparation of an organic carboxylic acid ester from an organic carboxylic acid selected from the group consisting of unsubstituted monocyclic aromatic carboxylic acids and unsubstituted saturated aliphatic carboxylic acids and a synthetic branched saturated aliphatic monohydric unsubstituted alcohol employing an acid-type esterification catalyst, the improvement which comprises adding to the esterification mixture a minor proportion of an unsaturated aliphatic dicarboxylic acid compound.

2. In a process for the preparation of organic carboxylic acid esters from phthalic acid and a synthetic branched chain saturated aliphatic monohydric unsubstituted Oxo alcohol in the presence of an acid-type esterification catalyst, the improvement which comprises carrying out the esterification in the presence of an unsaturated aliphatic dicarboxylic acid compound.

3. A process as in claim 2 in which the Oxo alcohol is in the $C_8$ to $C_{11}$ range.

4. A process as in claim 3 in which the Oxo alcohol employed comprises essentially as the major constituents 4,5-dimethyl hexanol, 3,5-dimethyl hexanol, 3,4-dimethyl hexanol, 3-methyl heptanol and 5-methyl heptanol.

*Table III*

|  | 1 | 2 | 3 | 4 | 5 | 6 | 7 | 8 | 9 | 10 | 11 | 12 |
|---|---|---|---|---|---|---|---|---|---|---|---|---|
| Maleic Anhydride, Percent [a] | 1.0 | 1.0 | 0.67 | 0.67 | 0.33 | 0.33 | 2.0 | 2.0 |  |  |  |  |
| Ethyl Maleate, Percent [a] |  |  |  |  |  |  |  |  | 1.0 | 1.0 |  |  |
| Diphenylol Propane [b] | 0.2 |  | 0.2 |  | 0.2 |  | 0.2 |  | 0.2 |  | 0.2 |  |
| Room Temperature Tensile Properties: [c] |  |  |  |  |  |  |  |  |  |  |  |  |
| Modulus @ 100% | 1,820 | 1,820 | 1,860 | 1,810 | 1,880 | 1,910 | 1,960 | 1,990 | 1,920 | 2,080 | 2,000 | 1,920 |
| Tensile Strength | 3,010 | 2,940 | 2,980 | 2,940 | 2,920 | 3,000 | 2,880 | 3,000 | 2,900 | 3,050 | 2,960 | 2,880 |
| Elongation | 310 | 290 | 295 | 290 | 300 | 305 | 270 | 295 | 285 | 280 | 280 | 260 |
| Aged 7 days @ 100° C.: |  |  |  |  |  |  |  |  |  |  |  |  |
| Modulus @ 100% | 2,250 | 2,240 | 2,310 | 2,260 | 2,160 | 2,120 | 2,360 | 2,340 | 2,270 | 2,370 | 2,220 | 2,280 |
| Tensile Strength | 2,940 | 2,310 | 2,880 | 2,400 | 2,940 | 2,310 | 2,980 | 2,480 | 2,920 | 2,440 | 2,800 | 2,310 |
| Elongation | 270 | 160 | 265 | 165 | 290 | 165 | 260 | 145 | 270 | 145 | 229 | 130 |
| Plasticizer Loss, Percent | 16.7 | 17.7 | 16.6 | 17.8 | 11.2 | 12.8 | 14.6 | 17.4 | 12.2 | 15.8 | 16.6 | 14.3 |

[a] Concentration present in weight percent on reactants during preparation of the di-iso-octyl phthalate.
[b] This is weight percent of diphenylol propane dissolved in the ester prior to compounding in polyvinyl chloride.
[c] Complete evaluation recipe: Geon 101, 100 parts by weight; lead stearate plasticizer, 50 parts by weight; and Vanstay 16, 2 parts by weight.

5. A process as in claim 4 in which the agent employed is maleic anhydride which is present in an amount of from 0.1 to 5 weight per cent based on the total reactants.

6. The process of claim 1 in which the aliphatic dicarboxylic acid compound is selected from the group consisting of aliphatic dicarboxylic acids, their esters and anhydrides.

7. The process of claim 6 in which the aliphatic dicarboxylic acid is maleic acid.

8. The process of claim 6 in which the aliphatic dicarboxylic acid is fumaric acid.

9. The process of claim 1 in which the acid type esterification catalyst is toluene sulfonic acid.

10. The process of claim 2 in which the aliphatic dicarboxylic acid compound is selected from the group consisting of aliphatic dicarboxylic acids, their esters and anhydrides.

11. The process as in claim 10 in which the aliphatic dicarboxylic acid is maleic acid.

12. The process as in claim 10 in which the aliphatic dicarboxylic acid is fumaric acid.

SAMUEL B. ROBISON.
JOHN REHNER, Jr.

No references cited.